United States Patent [19]
Nishimura et al.

[11] Patent Number: 6,045,376
[45] Date of Patent: Apr. 4, 2000

[54] EJECTION MECHANISM IN IC CARD CONNECTOR

[75] Inventors: Takeshi Nishimura, Narita; Toshiyasu Ito, Togane, both of Japan

[73] Assignee: Yamaichi Electronics Co., Ltd., Tokyo, Japan

[21] Appl. No.: 08/978,494

[22] Filed: Nov. 25, 1997

[30] Foreign Application Priority Data

Nov. 27, 1996 [JP] Japan ................................ 8-316716

[51] Int. Cl.[7] .................................................. H01R 13/62
[52] U.S. Cl. ............................................................. 439/159
[58] Field of Search ................................. 439/159, 160, 439/260

[56] References Cited

U.S. PATENT DOCUMENTS 5,304,070  4/1994  Bertho et al. .......................... 439/159

*Primary Examiner*—Michael L. Gellner
*Assistant Examiner*—Briggitte R. Hammond
*Attorney, Agent, or Firm*—Wenderoth, Lind & Ponack, L.L.P.

[57] ABSTRACT

In an IC card connector in which an IC card is inserted into a card receiving chamber through a card inlet port of a card case so that electrode pads of the IC card are brought into contactact with contacts of the card case, an ejecting mechanism in the IC card connector comprises a card pusher inserted into the card receiving chamber from outside the card case through a guide port provided on the card case and engageable with a front end face of the IC card. The card pusher is moved towards the card inlet port within the guide port to push the front end face of the IC card, so that a rear end portion of the IC card is ejected from the card inlet port.

14 Claims, 6 Drawing Sheets

EJECTION MECHANISM IN IC CARD CONNECTOR

BACKGROUND OF THE INVENTION

1. Field of the Invention

This invention relates to an ejection mechanism for ejecting an IC card from an IC card connector of a device.

For inputting or outputting data by inserting an IC card having therein an IC into a connector built in a personal computer or a camera, it is a conventional practice that the IC card is withdrawn by hand, or the IC card is ejected by turning an ejecting lever by pressing an end portion, this end portion projecting from a card inlet port, of a control lever linked to the ejecting lever within a card connector.

The method for withdrawing the IC card, which is inserted into the card connector and contacted, under pressure, with the contacts, by pulling an edge portion of the IC card slightly projecting from the card inlet port with fingers has such shortcomings that the IC card is difficult to withdraw due to a large withdrawing resistance, and an external impact tends to be applied to a rear edge portion of the IC card which is, in use, required to be exposed so as to be held by fingers.

Furthermore, in case the control lever and the ejecting lever are installed within the card case, the outer configuration of the card case is increased in size and in addition, an end portion of the control lever is required to be projected from the card inlet port.

The present invention has been accomplished in view of the above-mentioned shortcomings inherent in the conventional devices.

SUMMARY OF THE INVENTION

It is, therefore, an object of the present invention to provide an ejecting mechanism in an IC card connector which is simple in construction and yet capable of effectively ejecting a flat IC card from a flat IC card connector against the resistance of pressure contact between the IC card and contacts.

To achieve the above object, according to one aspect of the present invention, there is provided in an IC card connector in which an IC card is inserted into a card receiving chamber through a card inlet port of a card case so that electrode pads of the IC card are brought into contact with contacts of the card case, an ejecting mechanism in the IC card connector comprising a card pusher inserted into the card receiving chamber from outside the card case through a guide port provided on the card case and engageable with a front end face of the IC card. The card pusher is moved towards the card inlet port within the guide port to push the front end face of the IC card, so that a rear end portion of the IC card is ejected from the card inlet port.

From another aspect of the present invention, there is provided in an IC card connector having a card inlet port formed in a rear end face of a card case, in which an IC card is inserted into a card receiving chamber of the card case through the card inlet port so that electrode pads of the IC card thus inserted are brought into contact with contacts arranged within the card case, an ejecting mechanism in the IC card connector comprising a card pusher which can be inserted into the card receiving chamber from outside the card case through a pusher guide port opened at a front end face of the card case and opposing the card inlet port. The card pusher is moved towards the card inlet port within the guide port to push the front end face of the IC card, so that a rear end portion of the IC card is ejected from the card inlet port. It is preferred that a plurality of press-fit holes for the contacts open at the front end face of the card case, terminal pieces for connecting a wiring circuit board and continuous with first ends of the contacts are projected outside the card case through the press-fit holes, and the pusher guide port is continuous with the press-fit holes.

From a further aspect of the present invention, there is also provided in an IC card connector having a card inlet port formed in a rear end face of a card case, in which an IC card is inserted into a card receiving chamber of the card case through the card inlet port so that electrode pads of the IC card thus inserted are brought into contact with contacts arranged within the card case, an ejecting mechanism in the IC card connector comprising a card pusher which can be inserted into the card receiving chamber from outside the card case through a pusher guide port open at a top plate of the card case and engageable with a front end face of the IC card whose front end portion is exposed within the pusher guide port. The card pusher is moved towards the card inlet port to push the front end face of the IC card, so that a rear end portion of the IC card is ejected from the card inlet port. It is preferred that a front end portion of the pusher guide port opens at the front end face of the card case.

The card pusher may be supported such that the card pusher is guided by the top plate of the card case so as to be slid in a direction of insertion/withdrawal of the IC card.

It is preferred that the card pusher can be actuated by a control member provided on the side of a device having therein the IC card connector.

It is accepted that the card pusher forms a control member provided on the side of a device having therein the IC card connector.

The present invention will become more fully understood from the detailed description given hereinbelow and the accompanying drawings which are given by way of illustration only, and thus are not limitative of the present invention.

BRIEF DESCRIPTION OF THE DRAWINGS

FIG. 9(A) shows a state that an IC card is in an inserted position, and FIG. 9(B) shows a state that an IC card is in an ejected position;

FIG. 11(A) shows a state that an IC card is in an inserted position, and FIG. 11(B) shows a state that an IC card is in an ejected position.

DETAILED DESCRIPTION OF THE EMBODIMENTS

Figure 1A:
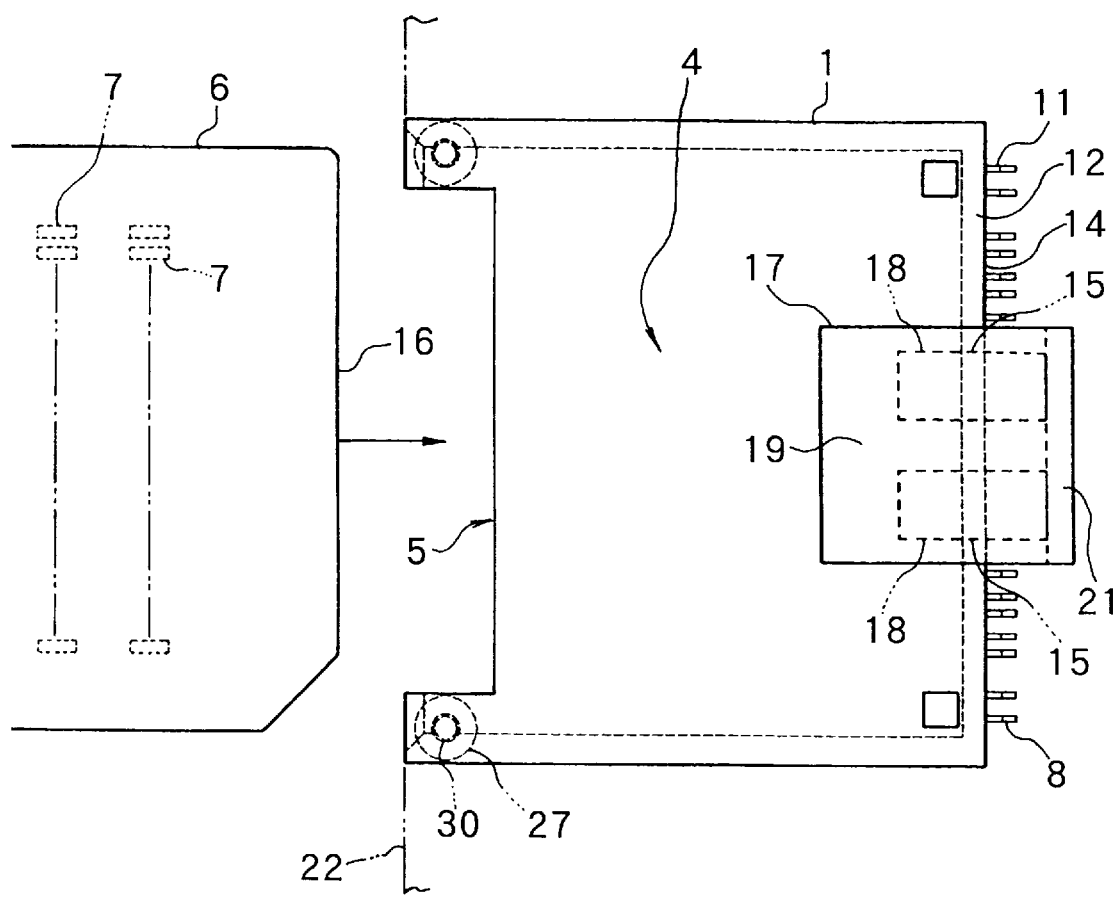
FIG. 1(A) is a plan view of an IC card connector according to the first embodiment of the present invention.

First Embodiment (see FIGS. 1(A)–1(B), 2, and 2(A)–3(B))

A connector body comprises a card case 1 made of insulative material and exhibits a flat and generally square configuration in a plan view. The card case I includes a card receiving chamber 4 formed between a top plate 2 and bottom plate 3, and a card inlet port 5 open at a rear end of the card receiving chamber 4, in other words, a rear end face of the card case 1.

An IC card 6 is inserted into the card case 1, namely, card receiving chamber 4, through the card inlet port 5, so that electrode pads 7 arranged on a lower surface of the IC card 6 will come into contact respectively with contacts 8 disposed within the card case 1.

The IC card 6 has IC chips as memory elements, and a plurality of electrode pads 7 as external terminals of the IC chips. The electrode pads 7 are arranged in parallel relation along a direction perpendicular to a direction of insertion of the IC card 6. Similarly, the contacts 8 are arranged along a parallel relation along a direction perpendicular to the direction of insertion of the IC card 6. Owing to this arrangement, when the IC card 6 is inserted, the contacts on the front and rear rows are brought into contact, under pressure, respectively with the electrode pads on the front and rear rows at a rear end of the inserted IC card 6. Through this pressure contact, the IC card 6 is connected to a data processing circuit within a device.

The contacts 8 are each comprised of a conductive elongated piece obtained by blanking and bending a metal plate. Each contact 8 includes a resilient elongated piece 9 slanted forwardly and upwardly from a basal end thereof towards a free end thereof, a contacting portion 10 projecting upwardly from the free end of the resilient elongated piece 9, and a terminal piece 11 provided on the other end thereof and adapted to be connected to the data processing circuit within the device.

The contacts 8 each extending in a direction of insertion of the IC card 6 are arranged in parallel relation (front and rear rows) along a direction perpendicular to the direction of insertion of the IC card 6. The contacts 8 on the front and rear rows are each fixed generally at a basal end thereof to a front wall 12 of the card case 1. The resilient elongated piece 9 of each contact 8 forwardly and upwardly extends from its fixed portion into the card receiving chamber 4. The contacting portion 10 provided on the free end is arranged on an insertion path of the IC card 6. The terminal piece 11 extends through the front wall 12 as the fixed portion of the contact 8 and projects outwardly.

As means for fixing the contact 8, the card case 1 is provided at the front wall 12 with a plurality of press-fit holes 13 which open at the front end face 14 of the card case 1 and communicate with the card receiving chamber 4. The press-fit holes 13 are arranged in parallel relation in a direction perpendicular to the direction of insertion of the IC card 6. A connecting portion between the resilient elongated piece 9 and the resilient piece 11 of each contact 8 is fixedly press-fitted into an inner wall of each press-fit hole 13.

The card case 1 has stands 26, 27 projecting from lower surfaces of its front and rear end portions, respectively. The stands 26, 27 are placed on the surface of a wiring circuit board 28. A positioning projection 29 provided on a lower surface of the front stand 26 is inserted into a positioning hole formed in the wiring circuit board 28. The rear stand 27 is provided with an internally threaded hole 30 which is open at a lower surface thereof. The rear stand 27 is tightly secured to the wiring circuit board 28 by an externally threaded screw 32 threadingly engaged in the internally threaded hole 30. The terminal piece 11 of each contact 8 extends downwardly to almost reach the lower surfaces (placing surfaces) of the stands 26, 27. A lower end of the terminal piece 11 is bent generally horizontally to form a surface mounting piece 31. The surface mounting piece 31 is welded to the surface of a lead pattern of the wiring circuit board 28 through a soldering paste. The front and rear ends of the card case is firmly fixed by means of the welding portion and the threadingly engaged portion.

The foregoing description is commonly applicable to the second to fifth embodiments as later described. A pusher guide port 15 opposing the card inlet port 5 is open at the card case front end face 14 at which the contact press-fit hole 13 is open. The pusher guide port 15 extends all the way through the front wall 12 and is communicated with the card receiving chamber 4. One end of the pusher guide port 15 faces the front end face 16 of the IC card 6 which is inserted in the card receiving chamber 4.

There is provided a card pusher 17 as means for pushing the IC card 6 out of the card case 1. It is designed such that the card pusher 17 is inserted into the card receiving chamber 4 from outside the card case 1 so as to be engageable with the front end face of the IC card 6.

The card pusher 17 is movable in a card insertion/withdrawal direction within the guide port 15. Owing to this arrangement, by moving the card pusher 17 towards the card inlet port 5 within the card guide port 5, in other words, by moving the card pusher 17 in a card withdrawal direction, the pusher 17 pushes the front end face 16 of the IC card 6, so that the rear end portion of the IC card 6 is pushed out of the card inlet port 5. By pinching the pushed-out portion of the IC card 6 with fingers, the IC card 6 can be withdrawn completely from the card case 1.

The card pusher 17 includes a pressing plate portion 18 which is inserted into the card receiving chamber 4 through the pusher guide port 15. The pressing plate portion 18 extends in the card withdrawal direction (towards the card inlet port) along the inner surface of the top plate 2 of the card case 1. The card pusher 17 further includes a guide plate portion 19 extending towards the card inlet port 5 along the outer surface of the top plate 2. One end portion of the guide plate portion 19 is connected to one end portion of the pressing plate portion 18 through a connecting portion 21 at the outside of the card case 1 namely, at the front end face 14 of the card case 1, thereby defining a guide groove 20 between the pressing plate portion 18 and the guide plate portion 19.

The card pusher 17 is attached to the interior of the guide groove 20 such that the front end portion of the top plate 2 of the card case 1 is sandwiched therebetween. The pressing plate portion 18 and the guide plate portion 19 extend along the inner and outer surfaces of the top plate 2 as previously mentioned. Owing to this arrangement, the card pusher 17 is guided between the inner surface of the top plate 2 and the inner surface of the bottom plate 3 in other words, between the upper and lower wall surfaces of the card receiving chamber 4, so that the card pusher 17 can be moved in the card insertion/withdrawal direction.

It is accepted that a plurality of the pusher guide ports 15 are provided and a plurality of the pressing plate portions 18 are provided in such a way as to correspond to the pusher guide ports 15. The pressing plate portions 18 are arranged in parallel and symmetrical relation so that the front end face 16 of the IC card 6 can be pushed by a uniform force. Of course, a single pressing plate portion 8 may be provided.

Preferably, the front end face of the pressing plate portion 18 is generally the same in thickness as the front end face of the IC card 6 so that the IC card 6 is pushed out with the front end face of the pressing plate portion 18 abutted with the front end face 16 of the IC card 6. Therefore, the pressing plate portion 18 can move within a small insertion space for the IC card 6.

Figure 3A:
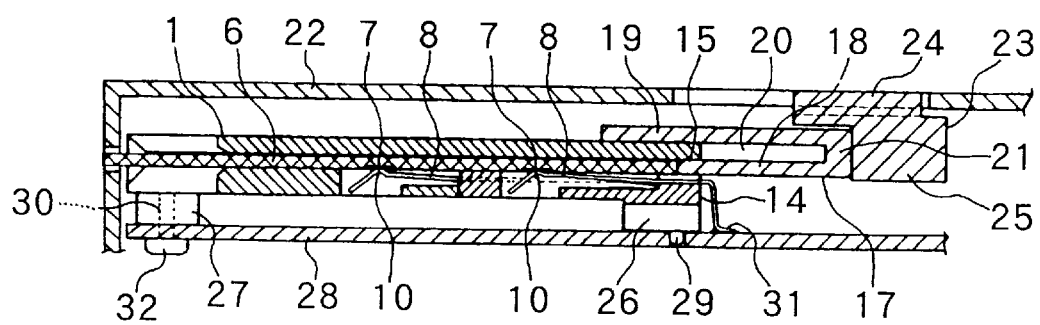
FIGS. 3(A) and 3(B) are sectional views showing the IC card connector of FIGS. 1(A)–1(B) installed in a device.
Figure 3B:
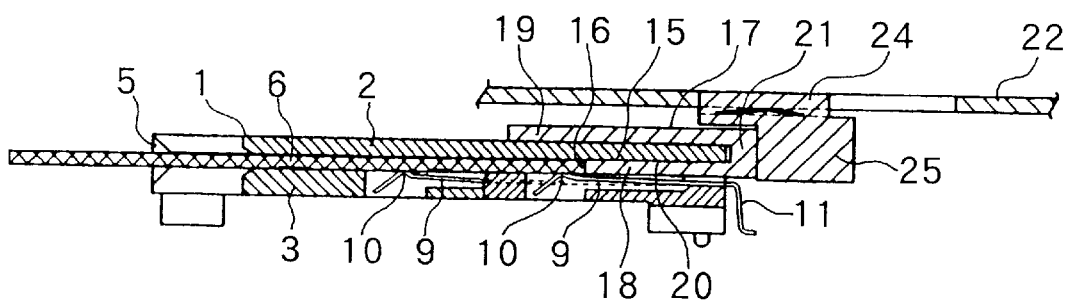

By moving the card pusher 17 from a standby position of FIG. 3(A) to an ejected position of FIG. 3(B) towards the card inlet port 5, the card pressing plate portion 18 presses the front end face of the IC card 6 inserted in the card receiving chamber 4, so that the rear end portion of the card 6 is ejected from the card inlet port 5. As shown in FIG. 3(B), by abutment of the connecting portion 21 between the pressing plate portion 18 and the guide plate portion 19 with the front end face of the top plate 2, the card pusher 17 is limited in its movement towards the card inlet port 5, thereby establishing an ejection quantity of the IC card 6.

The card pusher 17 moved to a position for pushing the IC card 6 is pushed by the front end face 16 of the IC card 6 when the IC card 6 is inserted again. Then, the card pusher 17 is moved to the standby position following the insertion of the IC card 6, so as to be ready for the next ejection of the IC card 6.

Figure 1B:
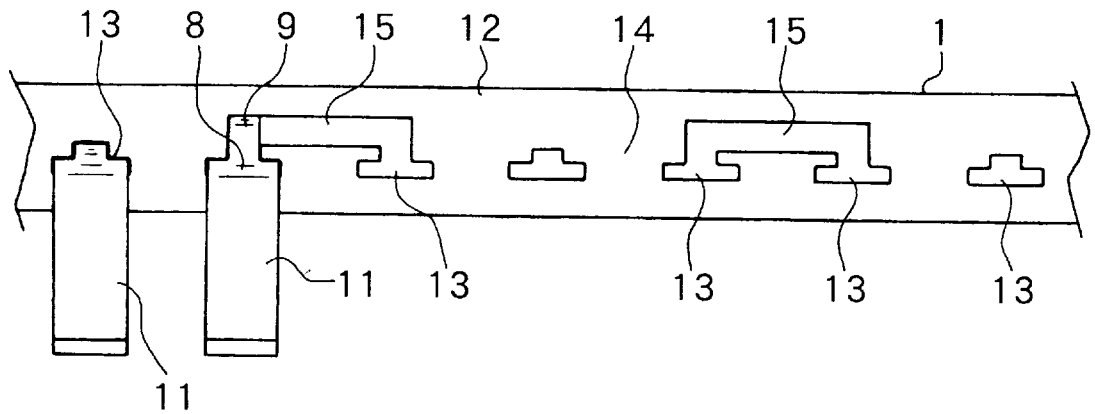
FIG. 1(B) is a front view showing a front end face of a card case constituting the connector of FIG. 1(A)
Figure 2:
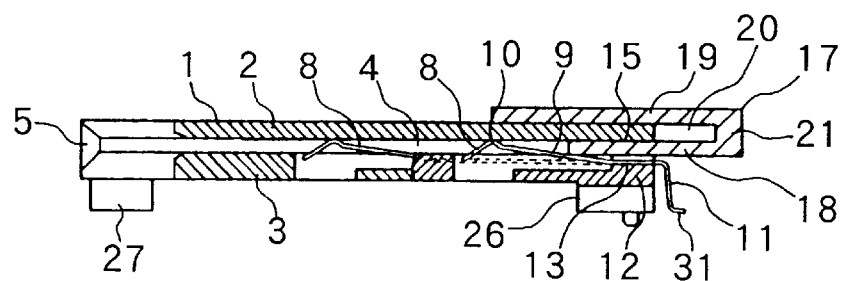
FIG. 2 is a sectional view of the IC card connector of FIGS. 1(A)–1(B)

As one preferred example, as shown in FIG. 1(B), the pusher guide port 15 is continuous with the openings of the contact press-fit holes 13. That is, the contact press-fit holes 13 are arranged at a small pitch on the front end face 14 of the card case 1, and the pusher guide port 15 is provided in such a manner as to be continuous with the upper portions of the adjacent contact press-fit holes 13. Accordingly, the pusher guide port 15 is continuous with and disposed between the adjacent contact press-fit holes 13.

This makes it possible to provide the contact press-fit hole 13 and the adjacent press-fit holes 13 in continuous relationship at the front end face 14 of the card case I having a limited thickness.

As shown in FIGS. 3(A) and 3(B), the card pusher 17 is actuated by control means provided on the side of the device having the IC card connector.

Also, the card pusher 17 is disposed such that it forms the control means provided on the side of the device having the IC card connector.

The IC card connector is disposed within a device such as a personal computer, a camera, or the like. The card inlet port 5 opens at the outer wall 22 of the device, so that the IC card 6 can be inserted and withdrawn therethrough.

A control button 23 is provided on the outer wall 22 of the device opposing the top plate 2, such that the control button 23 can reciprocally move in the card insertion/withdrawal direction. The control button 23 is engageable with the card pusher 17. That is, the pressing portion 25 of the control button 23 can be abutted with the outer surface of the connecting portion 21 of the card pusher 17. By operating the control portion 24 of the control button 23 exposed to the outer surface of the outer wall 22, the pressing portion 25 is caused to press the connecting portion 21 to move the card pusher 17 in the same direction, so that the IC card 6 is ejected. Accordingly, the connecting portion 21 forms a pressure receiving portion for the control button 23.

It may be designed such that the card pusher 17 itself serves also as the control button 23. That is, the card pusher 17 may be disposed on the outer wall 22 of the device in such a manner as to be able to slide in the card insertion/withdrawal direction, so that it acts on the front end face 16 of the IC card 6. In other words, the control button 23 itself is disposed in such a manner as to act on the front end face of the IC card 6 through the pusher guide port 15 so that the control button 23 can serve also as the card pusher 17.

When the IC card 6 is pushed out or ejected to the maximum extent by the card pusher 17, the contacting portion 10 of each contact 8 is in pressure-contact relation with the lower surface of the IC card 6. By this, the IC card 6 is prevented from jumping out and dropping from the card inlet port 5. The user can easily withdraw the IC card 6 simply by slightly pulling the IC card 6 with the fingers pinching the rear end portion of the IC card 6 sufficiently ejected by the card pusher 17.

The card pusher 17 is integrally molded from insulative material such as synthetic resin or the like. The card pusher 17 may be formed by blanking a metal plate having the same thickness as the IC card 6 and bending it.

Figure 4:
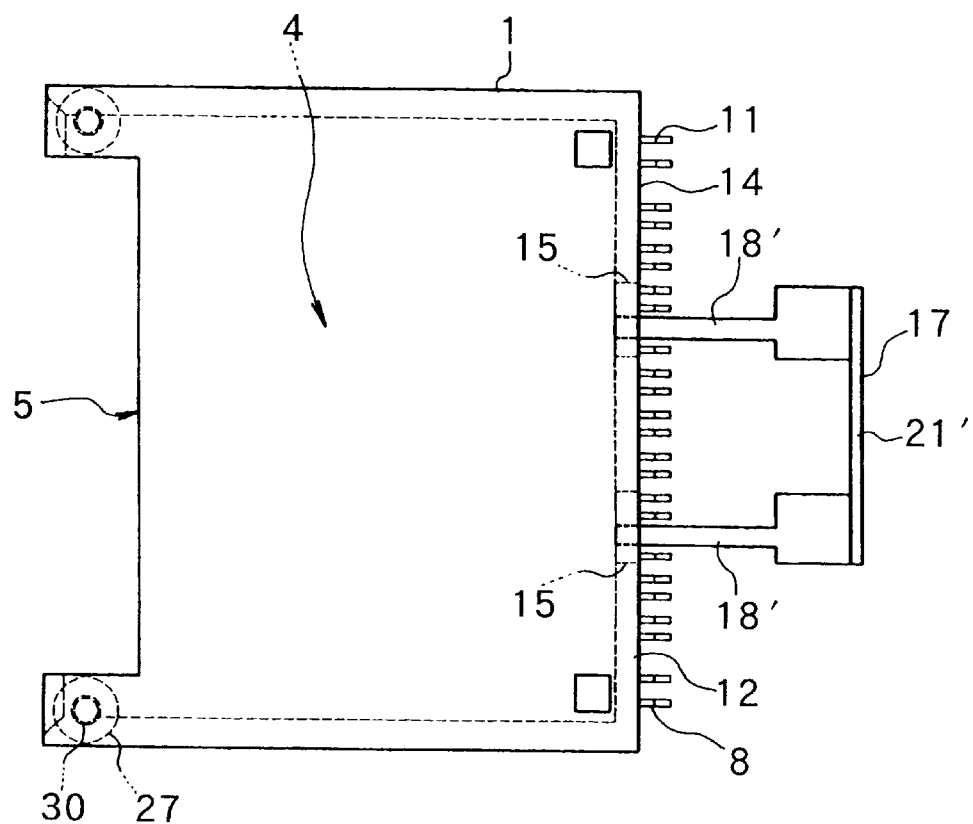
FIG. 4 is a plan view of an IC card connector according to the second embodiment of the present invention.
Figure 5:
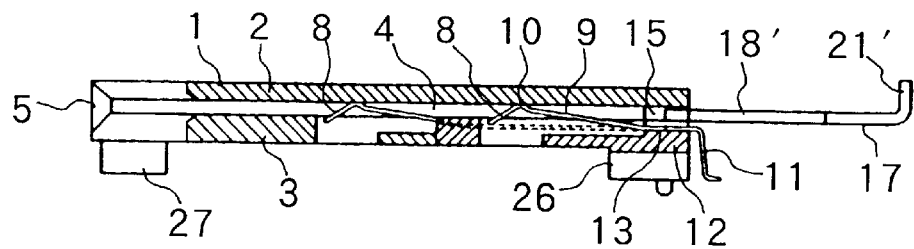
FIG. 5 is a sectional view of the IC card connector of FIG. 4.

Second Embodiment (see FIGS. 4 and 5)

This second embodiment shows a modification of the card pusher 17 in the first embodiment. The second embodiment is the same in construction as the first embodiment only excepting the card pusher 17.

The card pusher 17 in the second embodiment does not have the guide plate portion 19 of the first embodiment. Pressing fingers 18' move guided by the inner surface of the pusher guide port 15 opened at the front end face 14 of the card case 1 and the inner surface of card case top plate 2.

The pressing fingers 18' are arranged in parallel and symmetrical relation. First ends of the pressing fingers 18' are connected together at the outside of the card case 1. The pressing fingers 18' are inserted into the card receiving chamber 4 through the pusher guide port 15, which opens at the front end face 14 of the card case 1, such that the end faces of the pressing fingers 18' the end face of the IC card 6. By doing so, the end faces of the pressing fingers 18' are held in position ready to press the front end face 16 of the IC card 6.

A connecting portion for connecting the adjacent pressing fingers 18' is bent upwardly to form a pressure receiving portion 21'. The control button slidably provided on the outer wall 22 of the device is brought into engagement with the pressure receiving portion 21'. Owing to this arrangement, by moving the control button towards the card inlet port 5, the card pusher 17 is caused to move in the same direction, so that the IC card 6 is ejected by the pressing fingers 18'.

As in the first embodiment, the card pusher 17 itself may be served also as the control button. Since the card pusher 17 is formed with the pressure receiving portion 21' at its one end, it can be formed thin such that it is roughly within the range of the thickness of the card case 1.

The card pusher 17 having the above-mentioned construction can be made simply by blanking a metal plate having generally the same thickness as the IC card 6 and bending the pressure receiving portion 21'. This is very advantageous for forming the card pusher 17 in a thin design.

Figure 6:
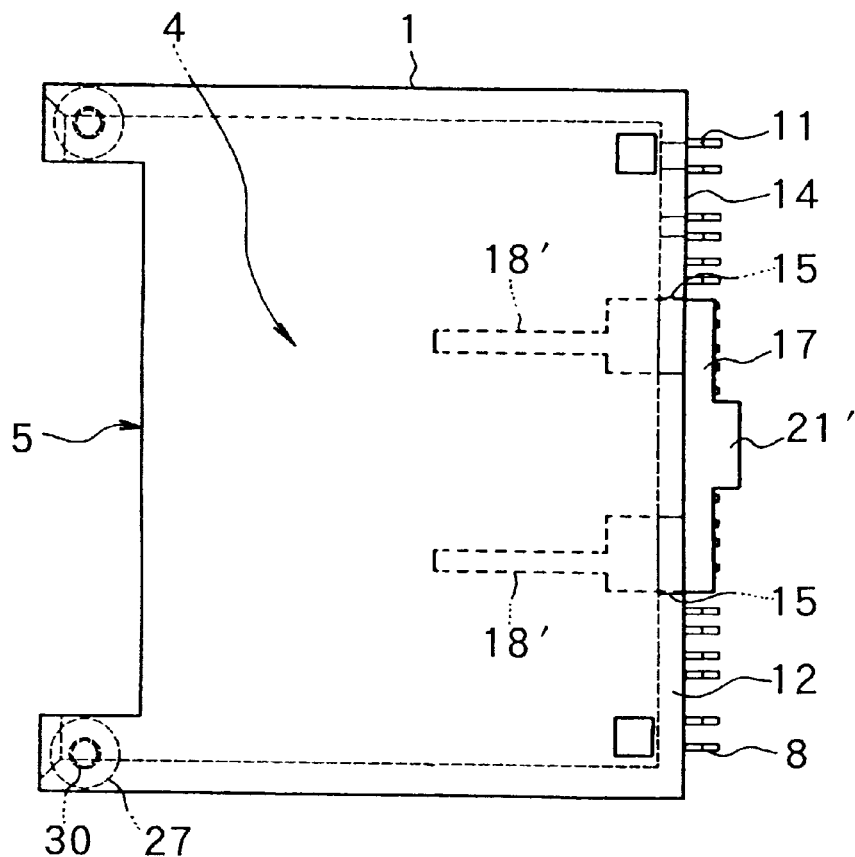
FIG. 6 is a plan view of an IC card connector according to the third embodiment of the present invention.
Figure 7:
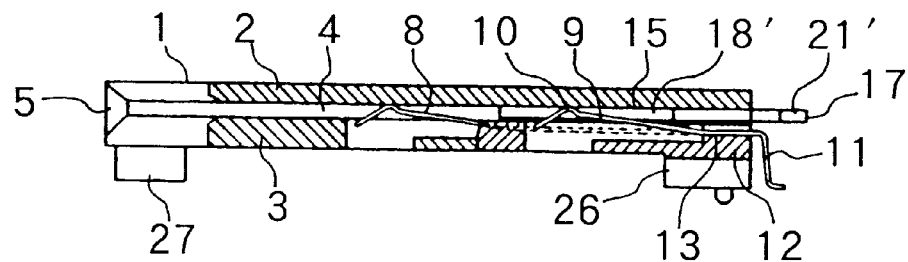
FIG. 7 is a sectional view of the IC card connector of FIG. 6.

Third Embodiment (see FIGS. 6 and 7)

FIGS. 6 and 7 show a modification of the card pusher 17 in the second embodiment. In the second embodiment, the connecting end portion of the card pusher 17 is bent upwardly to form the pressure receiving portion 21'. In the third embodiment, the pressure receiving portion 21' is designed to project on the same plane as the pressing fingers 18', so that the card pusher 17 exhibits a flat configuration as a whole.

Accordingly, this card pusher 17 can be formed simply by flatly blanking a metal plate and therefore, can be formed in a thin design.

Figure 8:
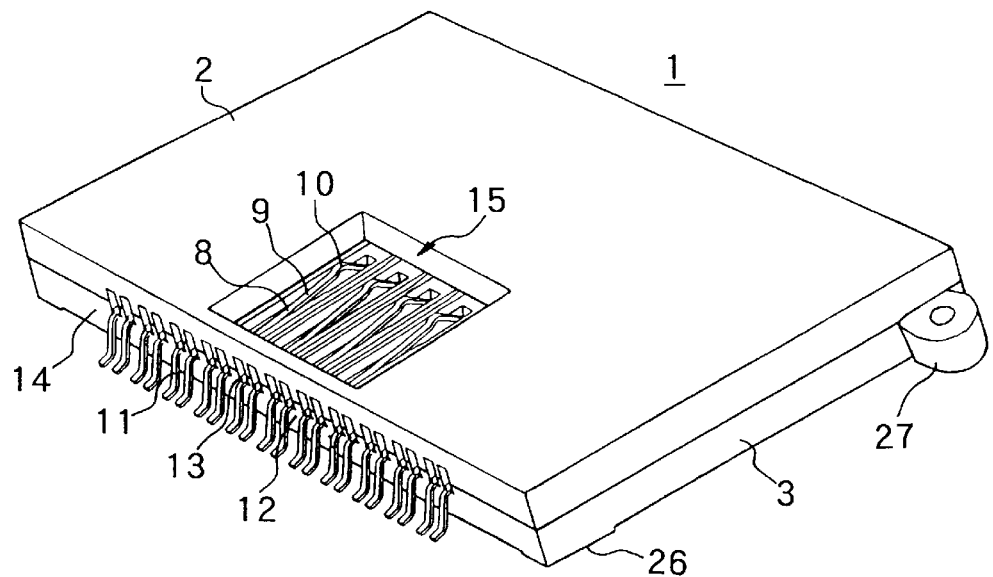
FIG. 8 is a perspective view of an IC card connector according to the fourth embodiment of the present invention.
Figure 9A:
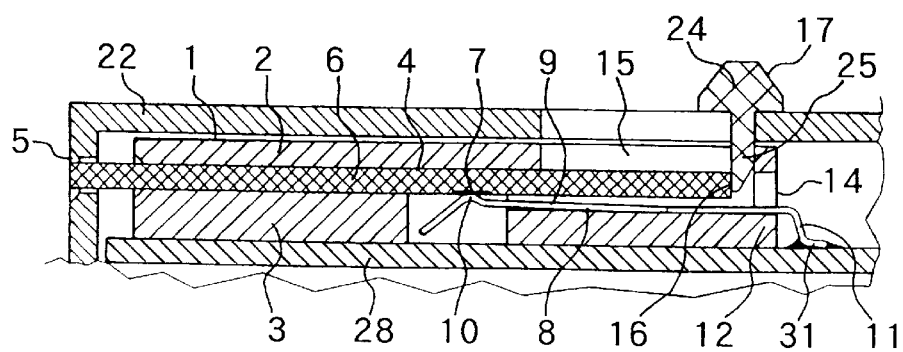
FIGS. 9(A)–9(B) are sectional views of the IC card connector of FIG. 8.
Figure 9B:
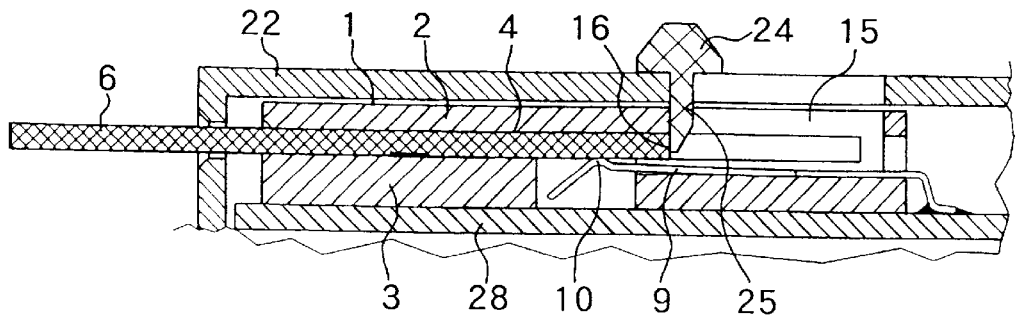

Fourth Embodiment (see FIGS. 8, and 9(A)–9(B))

In this fourth embodiment, the pusher guide port 15 is provided in the top plate 2 of the card case 1. The construction of the connector according to this fourth embodiment is the same as the first embodiment excepting the guide port 15 and the card pusher 17.

The pusher guide port 15, which opens at the top plate 2, is designed to extend at one end thereof proximate to the front end face 14 of the card case 1. The front end portion of the IC card 6 is exposed within the pusher guide port 15.

There is a provision of the card pusher 17 which is inserted into the card receiving chamber 4 from outside the card case 1 through the pusher guide port 15 and engageable with the front end face of the IC card 6. The card pusher 17 is supported by the outer wall 22 of the device opposing the top plate 2 in such a manner as to be movable in the card insertion/withdrawal direction. The card pusher 17 is provided on an upper portion thereof with the control portion 24 exposed to the outer surface of the outer wall 22. The pressing portion 25 provided on a lower portion of the card pusher 17 is inserted into the card receiving chamber 4 through the pusher guide port 15 so as to be engageable with the front end face of the IC card 6.

When the card pusher 17 is moved in a direction (card withdrawal direction) of the card inlet port 5 from the standby position of FIG. 9(A) by the control portion 24, the pressing portion 25 presses the front end face of the IC card 6 so that the rear end portion of the IC card 6 is ejected from the card inlet port 5.

In this fourth embodiment, the card pusher 17 also serves on the outer wall 22 of the device as the control button 23 operated by the user. In the alternative, however, it may be designed such that the card pusher 17 for pushing the IC card 6 and the control button 23 operated by the user are made of separate members respectively, so that the card pusher 17 is actuated by sliding the control button 23, as in the first embodiment.

Figure 10:
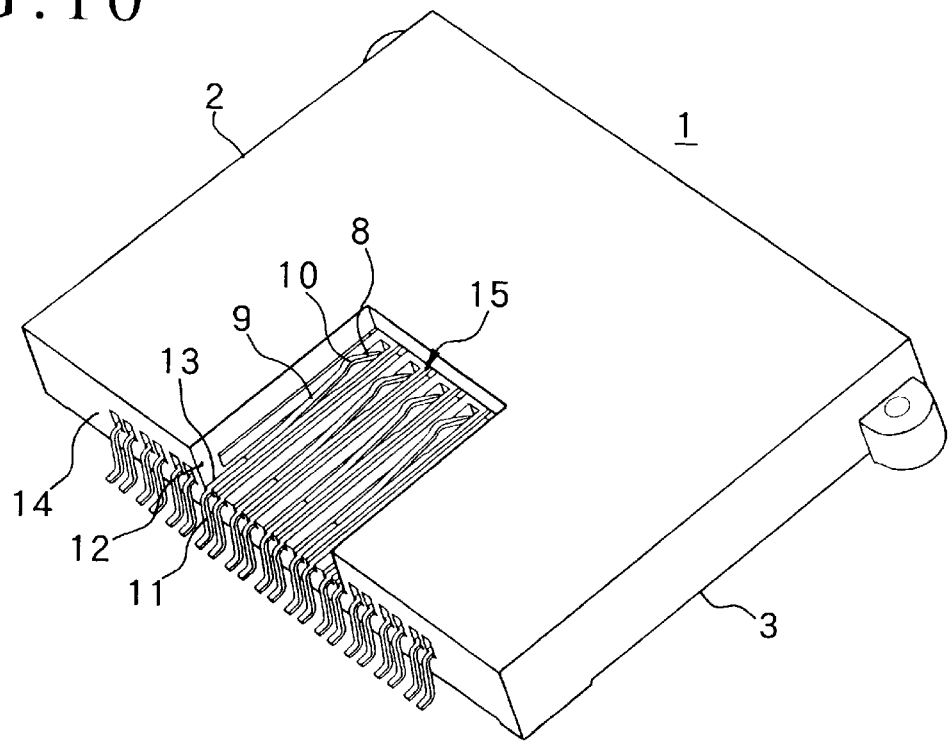
FIG. 10 is a perspective view of an IC card connector according to the fifth embodiment of the present invention.
Figure 11A:
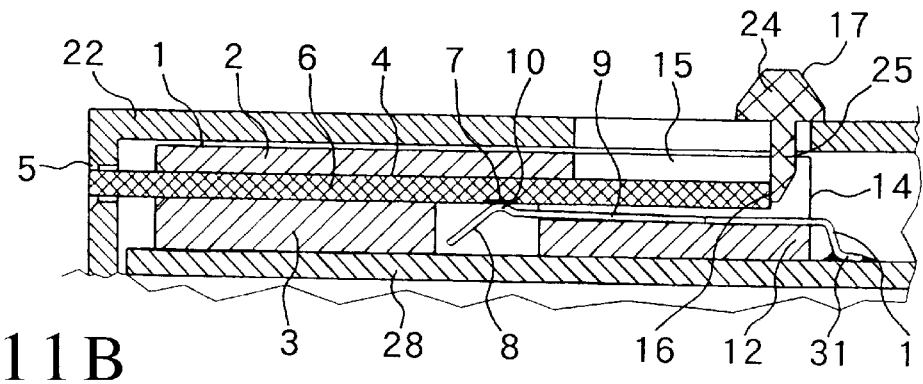
FIGS. 11(A)–11(B) are sectional views of the IC card connector of FIG. 10.
Figure 11B:
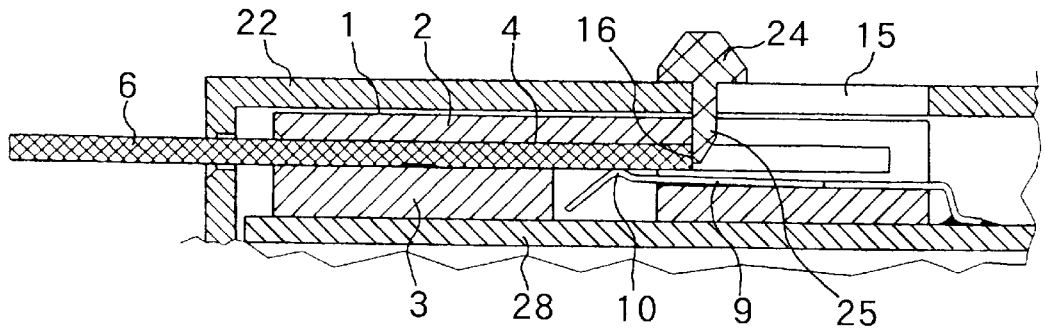

Fifth Embodiment (see FIGS. 10 and FIGS. 11(A)–11(B))

The fifth embodiment shows a modification of the pusher guide port 15 in the fourth embodiment. In the fourth embodiment, the pusher guide port 15 is designed to extend proximate to the front end face of the card case 1. In the fifth embodiment, the front end of the pusher guide port 15 opens at the front end face 14 of the card case 1 as shown in FIG. 10. In other words, the front wall 12 of the card case 1 is partly removed and the pusher guide port 15 opens therethrough.

In this example, as shown in FIGS. 11(A)–11(B), the pressing portion 25 of the card pusher 17 can be inserted through an opening portion in the front wall 12 of the card case 1, and therefore, the pressing portion 25 can assuredly be engaged with the front end face 16 of the IC card 6 which is inserted proximate to the inner surface of the front wall 12.

The pressing portion 25 of the card pusher 17 can be moved into and out of the card case 1 through the opening portion formed in the front end of the pusher guide port 15.

A plurality of the pusher guide ports 15 of the fourth and fifth embodiments may be provided. In that case, the card pusher 17 is also provided with a plurality of pressing portions 25 corresponding to the pusher guide ports 15.

According to the present invention, by sliding the card pusher on the outer wall surface of the device in the direction of the card inlet port, the IC card within the card case can assuredly be ejected. Moreover, the card case itself is not increased in thickness nor width unlike a case where the lever, etc. constituting the ejecting mechanism are disposed within the card case. As a consequence, the purpose for ejecting the IC card can be achieved while fulfilling the requirement for a thin design.

In addition, the IC card can be ejected from the card inlet port with such an extremely simple construction that the card pusher inserted from outside the card case through the pusher guide port is moved within the pusher guide port towards the card inlet port.

Although specific embodiments of the invention have been described, it will be appreciated that the invention is susceptible to modification, variation and change without departing from its proper scope as exemplified by the following claims.

What is claimed is:

1. In an IC card connector having a card inlet port formed in a rear end face of a card case, in which an IC card is inserted into a card receiving chamber, defined between top and bottom walls of said card case, through said card inlet port so that electrode pads of said IC card thus inserted are brought into contact with contacts arranged within said card case, an ejecting mechanism in said IC card connector comprising: a card pusher which can be inserted into said card receiving chamber from outside said card case through a pusher guide port open at a front end face of said card case and opposing said card inlet port, said card pusher being moved towards said card inlet port within said pusher guide port to push the front end face of said IC card, so that a rear end portion of said IC card is elected from said card inlet port; and wherein a plurality of press-fit holes for said contacts are open at the front end face of said card case, terminal pieces for connecting a wiring circuit board and continuous with first ends of said contacts are projected outside said card case through said press-fit holes, and said pusher guide port is continuous with said press-fit holes.

2. In an IC card connector having a card inlet port formed in a rear end face of a card case, in which an IC card is inserted into a card receiving chamber, defined between top and bottom walls of said card case, through said card inlet port so that electrode pads of said IC card thus inserted are brought into contact with contacts arranged within said card case, an ejecting mechanism in said IC card connector comprising: a card pusher which can be inserted into said card receiving chamber from outside said card case through a pusher guide port open at a front end face of said card case and opposing said card inlet port, said card pusher being moved towards said card inlet port within said pusher guide port to push the front end face of said IC card, so that a rear end portion of said IC card is ejected from said card inlet port; and wherein said ejecting mechanism further includes a control member mounted for movement relative to said card case in directions toward and away from said card inlet port and which, when moved towards said card inlet port, pushes said card pusher toward said card inlet port, said control member including a pressing portion engageable against said card pusher and a control portion movable with said pressing portion and projecting away therefrom so that said control portion can be exposed outwardly of a device in which said card connector is disposed to provide for control of said pressing portion.

3. The ejecting mechanism according to claim 2, wherein said card pusher is supported such that said card pusher is guided by the top wall of said card case so as to be slid in a direction of insertion/withdrawal of said IC card.

4. The ejecting mechanism of claim 2, wherein
said control member extends upwardly above said top wall of said card case.

5. The ejecting mechanism of claim 2, wherein
said control member is mounted for linear movement toward and away from said card inlet port.

6. In an IC card connector having a card inlet port formed in a rear end face of a card case, in which an IC card is inserted into a card receiving chamber, defined between top and bottom walls of said card case, through said card inlet port so that electrode pads of said IC card thus inserted are brought into contact with contacts arranged within said card case, an ejecting mechanism in said IC card connector comprising: a card pusher which can be inserted into said card receiving chamber from outside said card case through a pusher guide port open at a front end face of said card case and opposing said card inlet port, said card pusher being moved towards said card inlet port within said pusher guide port to push the front end face of said IC card, so that a rear end portion of said IC card is ejected from said card inlet port; and wherein said ejecting mechanism further includes a control member mounted for movement relative to said card case in directions toward and away from said card inlet port and which, when moved towards said card inlet port, pushes said card pusher toward said card inlet port, said control member including a pressing portion engageable against said card pusher and a control portion movable with said pressing portion and projecting away therefrom so that said control portion can be exposed outwardly of a device in which said card connector is disposed to provide for control of said pressing portion; and wherein said control portion of said control member is integral and unitary with said pressing portion of said control member.

7. The ejecting mechanism in an IC card connector according to claim 6, wherein said card pusher is supported such that said card pusher is guided by the top wall of said card case so as to be slid in a direction of insertion/withdrawal of said IC card.

8. The ejecting mechanism of claim 6, wherein
said control member extends upwardly above said top wall of said card case.

9. The ejecting mechanism of claim 6, wherein
said control member is mounted for linear movement toward and away from said card inlet port.

10. An IC card connector comprising:
a card case having a top wall, a bottom wall, a card receiving chamber defined between said top and bottom walls, a card inlet port which opens at a rear end face of said card case and into said card receiving chamber, a pusher guide port which opens at a front end face of said card case and into said card receiving chamber, and contacts arranged in said card case for contacting electrodes of an IC card when the IC card is received in said card receiving chamber; and an ejecting mechanism including a card pusher having a rear portion inserted into said card receiving chamber through said pusher guide port and being moveable in directions toward and away from said card inlet port, said rear portion of said card pusher being engageable against a front end of the IC card when the IC card is received in said card receiving chamber, and a control member mounted movably relative to said card case for movement in directions toward and away from said card inlet port; and wherein said control member includes a pressing member for engaging against and pushing said card pusher toward said card inlet port to thereby cause said card pusher to push the IC card to eject a rear end portion of the IC card from said card inlet port, and a control portion to be accessed from outside a device containing said card connector, said control portion being operably engaged with said pressing portion for pushing said pressing portion towards said card inlet port to push said card pusher towards said card inlet port and to thereby push the IC card to eject the rear end portion of the IC card from said card inlet port.

11. The IC card connector of claim 10, wherein
said control portion of said control member is integral and unitary with said pressing portion of said control member.

12. The IC card connector of claim 10, wherein
said control member extends upwardly above said top wall of said card case.

13. The IC card connector of claim 10, wherein
said control member is mounted for linear movement toward and away from said card inlet port.

14. The IC card connector of claim 10, wherein
said card pusher is supported such that said card pusher is guided by the top wall of said card case so as to be slid in a direction of insertion/withdrawal of said IC card.

* * * * *